US009850438B2

(12) United States Patent
Oprins

(10) Patent No.: US 9,850,438 B2
(45) Date of Patent: Dec. 26, 2017

(54) INTEGRATED HYDROCRACKING PROCESS

(71) Applicants: SAUDI BASIC INDUSTRIES CORPORATION, Riyadh (SA); SABIC GLOBAL TECHNOLOGIES B.V., Bergen Op Zoom (NL)

(72) Inventor: Arno Johannes Maria Oprins, Geleen (NL)

(73) Assignees: SABIC GLOBAL TECHNOLOGIES B.V., Bergen Op Zoom (NL); SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 15/121,096

(22) PCT Filed: Dec. 23, 2014

(86) PCT No.: PCT/EP2014/079214
§ 371 (c)(1),
(2) Date: Aug. 24, 2016

(87) PCT Pub. No.: WO2015/128040
PCT Pub. Date: Sep. 3, 2015

(65) Prior Publication Data
US 2017/0009154 A1 Jan. 12, 2017

(30) Foreign Application Priority Data

Feb. 25, 2014 (EP) .................................... 14156637

(51) Int. Cl.
*C10G 69/00* (2006.01)
*C10G 69/06* (2006.01)
(Continued)

(52) U.S. Cl.
CPC ............ *C10G 69/00* (2013.01); *C10B 57/045* (2013.01); *C10G 9/00* (2013.01); *C10G 9/005* (2013.01);
(Continued)

(58) Field of Classification Search
CPC .......... C10G 69/00; C10G 9/00; C10G 69/06; C10G 9/36; C10G 9/005; C10G 2400/22;
(Continued)

(56) References Cited

U.S. PATENT DOCUMENTS 3,839,484 A 10/1974 Zimmerman, Jr. et al.
4,137,147 A 1/1979 Franck et al.
(Continued)

FOREIGN PATENT DOCUMENTS

| CN | 101268170 | 9/2008 |
|----|-----------|--------|
| EP | 0192059 A1 | 8/1986 |
| GB | 2162082 A | 1/1986 |

OTHER PUBLICATIONS

International Search Report for PCT/EP2014/079214 dated Mar. 9, 2015 (3 pages).

*Primary Examiner* — Randy Boyer
*Assistant Examiner* — Juan Valencia
(74) *Attorney, Agent, or Firm* — Norton Rose Fulbright US LLP

(57) ABSTRACT

An integrated hydrocracking process for production of olefinic and aromatic petrochemicals from a hydrocarbon feedstock having crude oil. An object of the present invention is to provide an integrated hydrocracking process for the production of olefinic and aromatic petrochemicals from a hydrocarbon feedstock comprising crude oil in which the portion of crude oil converted to LPG is increased significantly.

20 Claims, 1 Drawing Sheet

(51) Int. Cl.
*C10G 9/00* (2006.01)
*C10G 9/36* (2006.01)
*C10B 57/04* (2006.01)

(52) U.S. Cl.
CPC ............... *C10G 9/36* (2013.01); *C10G 69/06* (2013.01); *C10G 2400/20* (2013.01); *C10G 2400/22* (2013.01); *C10G 2400/30* (2013.01); *Y02P 20/132* (2015.11)

(58) Field of Classification Search
CPC ............ C10G 2400/20; C10G 2400/30; C10B 57/045; Y02P 20/132
See application file for complete search history.

(56) References Cited

U.S. PATENT DOCUMENTS

| | | | |
|---|---|---|---|
| 4,792,390 A | 12/1988 | Staggs et al. | |
| 4,827,072 A | 5/1989 | Imai et al. | |
| 4,926,005 A | 5/1990 | Olbrich et al. | |
| 7,622,623 B2 | 11/2009 | Fridman et al. | |
| 2006/0287561 A1 | 12/2006 | Choi et al. | |
| 2007/0062848 A1 | 3/2007 | Oballa et al. | |
| 2010/0122931 A1 | 5/2010 | Zimmerman et al. | |
| 2013/0248416 A1 | 9/2013 | Shafi et al. | |
| 2013/0248417 A1 | 9/2013 | Sayed et al. ................... 208/57 |
| 2013/0248418 A1* | 9/2013 | Sayed ................... C10G 47/26 208/57 |

* cited by examiner

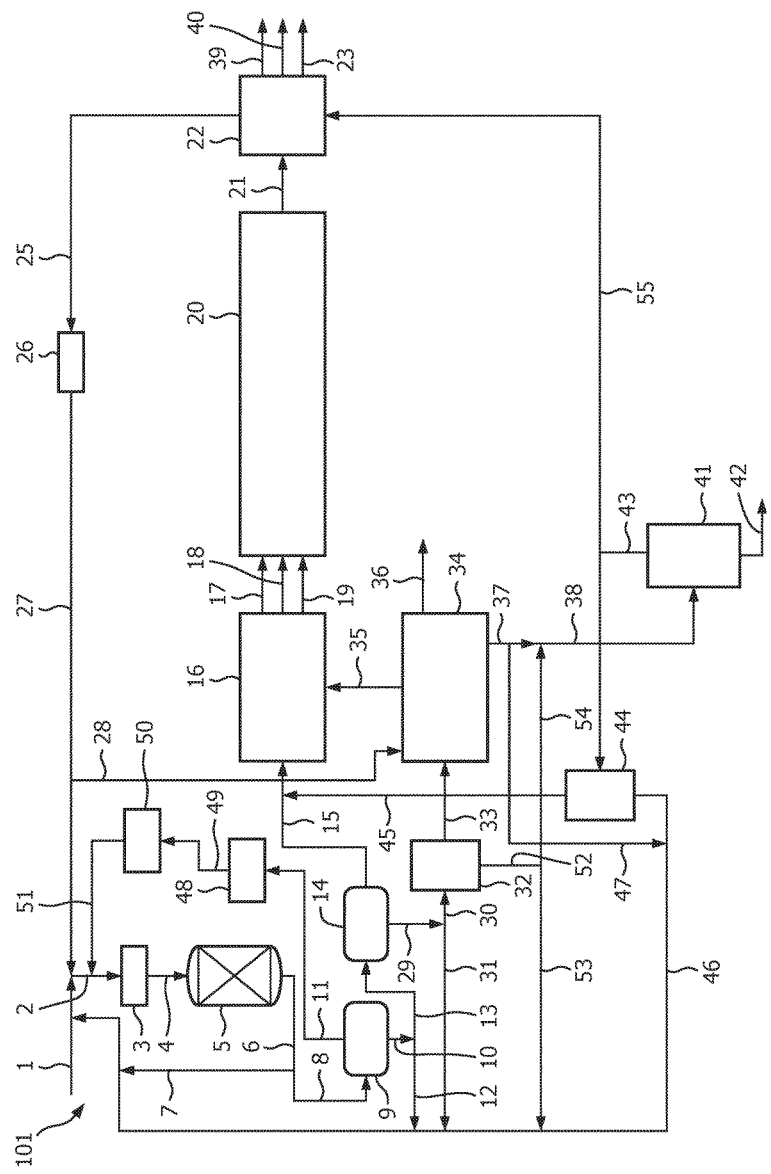

INTEGRATED HYDROCRACKING PROCESS

The present invention relates to an integrated hydrocracking process for production of olefinic and aromatic petrochemicals from a hydrocarbon feedstock comprising crude oil.

Such a process is known from US2013/248416. This US2013/248416 disclose an integrated process for the direct processing of a crude oil wherein crude oil and recycled coker liquid product are charged to a hydroprocessing zone operating under conditions effective to produce a hydroprocessed effluent. The hydroprocessed effluent is thermally cracked in the presence of steam to produce a mixed product stream. A residual liquid fraction recovered upstream of the thermal cracking unit or between the convection and pyrolysis steps of the steam cracking operation is thermally cracked in a coker unit under conditions effective to produce coke and coker liquid product. The coker liquid product is recycled to the step of hydroprocessing while the petroleum coke is recovered. Hydrogen from the mixed product stream is purified and recycled to the hydroprocessing zone, and olefins, aromatics and pyrolysis fuel oil are recovered from the separated mixed product stream.

In the process according to US2013/248416 the crude oil is hydrocracked to produce a liquid hydrocarbon feed for subsequent processing by means of steam cracking. Steam cracking of heavy liquid feeds results in relatively poor cracker product slate including a relatively small amount of high value chemicals. This is partly compensated by means of sending some of these heavy hydrocarbons together with the heaviest effluent of the first hydrocracker to a coker where this heavy material is further cracked into liquid hydrocarbon steam cracker feed (possibly needing saturation first). In addition, reactor effluents from the hydroprocessing reaction zone are cooled in an exchanger and sent to a high pressure cold or hot separator 6. Separator bottoms from the high pressure separator, which are in a substantially liquid phase, are cooled and then introduced to a low pressure cold separator. Remaining gases, including hydrogen, H2S, NH3 and any light hydrocarbons, which can include C1-C4 hydrocarbons, are purged from the low pressure cold separator and sent for further processing, such as flare processing or fuel gas processing. Hydrogen and other light hydrocarbons are combined with steam cracker products as a combined feed to the product separation zone.

U.S. Pat. No. 4,137,147 relates to a process for manufacturing ethylene and propylene from a charge having a distillation point lower than about 360 DEG C. and containing at least normal and iso-paraffins having at least 4 carbon atoms per molecule, wherein: the charge is subjected to a hydrogenolysis reaction in a hydrogenolysis zone, in the presence of a catalyst, (b) the effluents from the hydrogenolysis reaction are fed to a separation zone from which are discharged (i) from the top, methane and possibly hydrogen, (ii) a fraction consisting essentially of hydrocarbons with 2 and 3 carbon atoms per molecule, and (iii) from the bottom, a fraction consisting essentially of hydrocarbons with at least 4 carbon atoms per molecule, (c) only the fraction consisting essentially of hydrocarbons with 2 and 3 carbon atoms per molecule is fed to a steam-cracking zone, in the presence of steam, to transform at least a portion of the hydrocarbons with 2 and 3 carbon atoms per molecule to monoolefinic hydrocarbons; the fraction consisting essentially of hydrocarbons with at least 4 carbon atoms per molecule, obtained from the bottom of the separation zone, is supplied to a second hydrogenolysis zone where it is treated in the presence of a catalyst, the effluent from the second hydrogenolysis zone is supplied to a separation zone to discharge, on the one hand, hydrocarbons with at least 4 carbon atoms per molecule which are recycled at least partly to the second hydrogenolysis zone, and, on the other hand, a fraction consisting essentially of a mixture of hydrogen, methane and saturated hydrocarbons with 2 and 3 carbon atoms per molecule; a hydrogen stream and a methane stream are separated from the mixture and there is fed to the steam-cracking zone the hydrocarbons of the mixture with 2 and 3 carbon atoms, together with the fraction consisting essentially of hydrocarbons with 2 and 3 carbon atoms per molecule as recovered from the separation zone following the first hydrogenolysis zone. At the outlet of the steam-cracking zone are thus obtained, in addition to a stream of methane and hydrogen and a stream of paraffinic hydrocarbons with 2 and 3 carbon atoms per molecule, olefins with 2 and 3 carbon atoms per molecule and products with at least 4 carbon atoms per molecule.

US patent application No. 2006/287561 relates to a process for increasing the production of C2-C4 light olefin hydrocarbons by integrating a process for producing an aromatic hydrocarbon mixture and liquefied petroleum gas (LPG) from a hydrocarbon mixture and a process for producing a hydrocarbon feedstock which is capable of being used as a feedstock in the former process.

U.S. Pat. No. 3,839,484 relates to a process for the preparation of unsaturated hydrocarbons by pyrolysis of naphthas boiling in the range of about 80 to 450 F. in a pyrolysis furnace, comprising hydrocracking the naphthas to form a mixture of paraffins and iso paraffins and pyrolyzing the resulting mixture of paraffins and isoparaffins in a pyrolysis furnace.

US patent application No 2007/062848 relates to a process for hydrocracking a feed comprising not less than 20 weight % of one or more aromatic compounds containing at least two fused aromatic rings which compounds are unsubstituted or substituted by up to two C1-4 alkyl radicals to produce a product stream comprising not less than 35 weight % of a mixture of C2-4 alkanes. According to US patent application No 2007/062848 bitumen from the oil sands is fed to a conventional distillation unit, and a naphtha stream from the distillation unit is fed to a naphtha hydrotreater unit. The overhead gas stream is a light gas/light paraffin stream and fed to hydrocarbon cracker. A diesel stream from the distillation unit is fed to a diesel hydrotreater unit, and the gas oil stream from the distillation unit is fed to a vacuum distillation unit, wherein a vacuum gas oil stream from the vacuum distillation unit is fed to a gas oil hydrotreater. A light gas stream from the gas oil hydrotreater is fed to hydrocarbon cracker. The hydrotreated vacuum gas oil from the vacuum gas oil hydrotreater is fed to a catalytic cracker unit. The bottom stream from the vacuum distillation unit is a vacuum (heavy) residue and is sent to a delayed coker producing a number of streams, such as a naphtha stream being sent to a naphtha hydrotreater unit, a diesel stream is sent to diesel hydrotreater unit to produce hydrotreated diesel, and a gas oil stream is fed to a vacuum gas oil hydrotreater unit resulting in a hydrotreated gas oil stream which is fed to a catalytic cracker unit.

U.S. Pat. No. 4,792,390 relates to a process for the maximization of middle distillate from heavy distillate hydrocarbon while minimizing hydrogen consumption, namely a process for the conversion of an aromatic-rich, distillable gas oil charge, which process comprises the steps of: (a) reacting the charge stock with hydrogen, in a catalytic hydrocracking reaction zone, (b) separating the resulting hydrocracking reaction zone effluent to provide a middle distillate product stream and a paraffin-rich hydrocarbonaceous stream (d) reacting the paraffin-rich hydrocarbonaceous stream recovered in step (b) in a thermal coking zone at mild thermal coking conditions (e) separating the thermal coking zone effluent to provide a liquid fraction and a distillable hydrocarbonaceous stream and (f) recycling at least a portion of the distillable hydrocarbonaceous stream to the catalytic hydrocracking reaction zone in step (a), wherein the thermal coking zone effluent is recycled to the catalytic hydrocracking reaction zone of step (a).

US patent application No 2010/122931 relates to an integrated process for preparing a slurry hydrocracking (SHC) distillate, the process comprising: (a) coking an SHC gas oil to obtain a liquid coker product and coke; (b) passing a heavy hydrocarbon feedstock comprising at least a portion of the liquid coker product through an SHC reaction zone in the presence of hydrogen to provide an SHC effluent; and (b) recovering the SHC distillate and the SHC gas oil from the SHC effluent, wherein the liquid coker product is obtained from a delayed coker or a fluidized coker.

An aspect of such an integrated process is that significant amounts of heavier steam cracking components are recycled over the steam cracker and coker ultimately resulting in additional production of coke/pitch and increased equipment size and energy demand.

Another aspect is that steam cracking of liquid feeds (and LPG with the exception of ethane) furthermore results in significant amounts of methane being produced to be used as fuel in the steam cracking furnaces. This means that some of the more valuable crude oil is therefore downgraded to methane fuel value. In addition to the carbon atoms representing this efficiency loss there is also a lot of hydrogen lost via this methane as well. As a result more hydrogen than necessary needs to be added to the crude oil making the overall hydrogen balances less favourable.

Another aspect of the integrated process is that any LPG made in the hydrocracking processing steps is sent to the compressor and subsequent steam cracker separation section first. The effect thereof is an increase in the sizing and the energy spend in these downstream separations as the desired steam cracking products are diluted first with this LPG (i.e. adding ethane to the ethylene and propane to propylene product to be separated again).

BRIEF SUMMARY OF THE INVENTION

An object of the present invention is to provide an integrated hydrocracking process for production of olefinic and aromatic petrochemicals from a hydrocarbon feedstock comprising crude oil wherein the aforementioned problems have been overcome.

Another object of the present invention is to provide an integrated hydrocracking process for production of olefinic and aromatic petrochemicals from a hydrocarbon feedstock comprising crude oil wherein the portion of the crude oil converted to LPG is increased significantly.

Another object of the present invention is to provide an integrated hydrocracking process for production of olefinic and aromatic petrochemicals from a hydrocarbon feedstock comprising crude oil wherein efficiency and selectivity of the hydrocracking step is by controlled by the severity.

The present invention relates thus to an integrated hydrocracking process for production of olefinic and aromatic petrochemicals from a hydrocarbon feedstock comprising crude oil, the process comprising:

treating the feedstock comprising crude oil and a coker liquid product in a first hydrocracking zone in the presence of hydrogen under conditions effective to produce a first effluent having an increased hydrogen content;

separating the first effluent into a LPG comprising stream and a liquid phase stream;

separating said LPG comprising stream into one or more streams chosen from the group of a stream comprising hydrogen, a stream comprising methane, a steam comprising ethane, a stream comprising butanes, a stream comprising propane, a stream comprising C1-minus, a stream comprising C3-minus, a stream comprising C1-C2, a stream comprising C3-C4, a stream comprising C2-C3, a stream comprising C1-C3, a stream comprising C1-C4, a stream comprising C2-C4, a stream comprising C2-minus, a stream comprising C4-minus;

further processing one or more of the streams thus obtained in at least a steam cracker unit and one unit, chosen from the group of a butanes dehydrogenation unit, a propane dehydrogenation unit, a combined propane-butanes dehydrogenation unit, or a combination of units thereof to produce a mixed product stream(s);

feeding the mixed product stream(s) from said steam cracker unit and at least one unit, chosen from the group of a butanes dehydrogenation unit, a propane dehydrogenation unit, a combined propane-butanes dehydrogenation unit, or a combination of units thereof to a second separation section;

thermally cracking the liquid phase feed under conditions effective to produce coke and the coker liquid product, wherein the coker liquid product is recycled to the first hydrocracking zone and wherein petroleum coke is recovered;

separating the mixed product stream(s).

According to the present invention the LPG comprising stream is separated into one or more streams chosen from the group of a stream comprising hydrogen, a stream comprising methane, a steam comprising ethane, a stream comprising butanes, a stream comprising propane, a stream comprising C1-minus, a stream comprising C3-minus, a stream comprising C1-C2, a stream comprising C3-C4, a stream comprising C2-C3, a stream comprising C1-C3, a stream comprising C1-C4, a stream comprising C2-C4, a stream comprising C2-minus, a stream comprising C4-minus using any appropriate separation technology. The present method thus focuses on the optimization of the production of LPG comprising streams, which LPG comprising streams are identified as highly useful feedstocks for steam pyrolysis processes and/or dehydrogenation processes for the production of olefinic and aromatic petrochemicals.

Depending on, inter alia, the economics, capacity and market demands the lower hydrocarbon fractions, such as at least one stream chosen from the group of a stream comprising C1-C2, a stream comprising ethane and a stream comprising C2-minus, are sent to the gas steam cracker section. This means that no heavier steam cracking components are recycled over the steam cracker and coker unit ultimately resulting in a small production of coke/pitch and decreased equipment size and energy demand. Alternative separation scheme's resulting in a combined propane/butanes stream, possibly also diluted with methane and/or ethane or a propane stream possibly diluted with methane and/or ethane can be used.

A stream comprising ethane and/or a stream comprising C2-minus and/or a stream comprising C1-C2, is preferably fed to a gas steam cracking unit, and the propane and butane comprising streams are preferably fed to dehydrogenation units. This processing route results in much higher carbon efficiency and also produces the amounts of hydrogen needed for the high conversion hydrocracking all the way to LPG.

Thus the present method comprises the combination of a steam cracker unit and at least one unit chosen from the group of a butanes dehydrogenation unit, a propane dehydrogenation unit, a combined propane-butanes dehydrogenation unit, or a combination of units thereof to produce a mixed product stream. This combination of units provides a high yield of the desired products, namely olefinic and aromatic petrochemicals, wherein the portion of the crude oil converted to LPG is increased significantly.

According to a preferred embodiment the LPG comprising stream is separated into one or more streams, wherein the stream comprising hydrogen is preferably used as a hydrogen source for hydrocracking purpose, the stream comprising methane is preferably used as a fuel source, the stream comprising ethane is preferably used as a feed for the gas steam cracking unit, the stream comprising propane is preferably used as a feed for a propane dehydrogenation unit, a stream comprising butanes is preferably used as a feed for a butane dehydrogenation unit, a stream comprising C1-minus is preferably used as a fuel source and/or as a hydrogen source, a stream comprising C3-minus is preferably used as a feed for a propane dehydrogenation unit but, according to another embodiment, also as a feed for the gas steam cracking unit, a stream comprising C2-C3 is preferably used as a feed for a propane dehydrogenation unit, but, according to another embodiment, also as a feed for the gas steam cracking unit, a stream comprising C1-C3 is preferably used as a feed for a propane dehydrogenation unit, but, according to another embodiment, also as a feed for the gas steam cracking unit, a stream comprising C1-C4 butanes is preferably used as a feed for a butane dehydrogenation unit, a stream comprising C2-C4 butanes is preferably used as a feed for a butane dehydrogenation unit, a stream comprising C2-minus is preferably used as a feed for the gas steam cracking unit, a stream comprising C3-C4 is preferably used as a feed for a propane or butane dehydrogenation unit, or a combined propane and butane dehydrogenation unit, a stream comprising C4-minus is preferably used as a feed for a butane dehydrogenation unit.

As used herein, the term "C# hydrocarbons" or "C#", wherein "#" is a positive integer, is meant to describe all hydrocarbons having # carbon atoms. Moreover, the term "C#+ hydrocarbons" or "C#+" is meant to describe all hydrocarbon molecules having # or more carbon atoms. Accordingly, the term "C5+ hydrocarbons" or "C5+" is meant to describe a mixture of hydrocarbons having 5 or more carbon atoms. The term "C5+ alkanes" accordingly relates to alkanes having 5 or more carbon atoms. Accordingly, the term "C# minus hydrocarbons" or "C# minus" is meant to describe a mixture of hydrocarbons having # or less carbon atoms and including hydrogen. For example, the term "C2–" or "C2 minus" relates to a mixture of ethane, ethylene, acetylene, methane and hydrogen. For example, the term C1-C3 refers to a mixture comprising C1, C2 and C3. Finally, the term "C4mix" is meant to describe a mixture of butanes, butenes and butadiene, i.e. n-butane, i-butane, 1-butene, cis- and trans-2-butene, i-butene and butadiene.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG generally consists of a blend of C3-C4 hydrocarbons i.e. a mixture of C3 and C4 hydrocarbons.

The one of the petrochemical products produced in the process of the present invention is BTX. The term "BTX" as used herein relates to a mixture of benzene, toluene and xylenes. Preferably, the product produced in the process of the present invention comprises further useful aromatic hydrocarbons such as ethyl benzene. Accordingly, the present invention preferably provides a process for producing a mixture of benzene, toluene xylenes and ethyl benzene ("BTXE"). The product as produced may be a physical mixture of the different aromatic hydrocarbons or may be directly subjected to further separation, e.g. by distillation, to provide different purified product streams. Such purified product stream may include a benzene product stream, a toluene product stream, a xylene product stream and/or an ethyl benzene product stream.

According to the present method a small amount of methane is produced and the methane can be used as fuel for the steam cracking and dehydrogenation furnaces. Any heavier material can be recycled to the different stages of the described process.

According to a preferred embodiment the process further comprises treating said liquid phase feed in a second hydrocracking zone in the presence of hydrogen under conditions effective to produce a second effluent having an increased hydrogen content;

recovering from the second effluent from said second hydrocracking zone a BTXE comprising stream, a LPG comprising stream and a residual liquid stream.

One of the advantages of a second hydrocracking zone is that it gives more control over the efficiency and selectivity of the hydrocracking steps by controlling the severity.

According to a preferred embodiment the process further comprises thermally cracking said residual liquid stream under conditions effective to produce coke and the coker liquid product wherein the coker liquid product(s) is/are recycled to the inlet of the first hydrocracker and/or second hydrocracking zone, and wherein petroleum coke is recovered. In the coker zone all heavy hydrocarbon fractions are converted to lighter feed that can be converted to LPG in one of the hydrocracking zones. And these LPG comprising streams will be sent to any one of steam cracker unit and dehydrogenation units.

The present method further preferably comprises feeding at least one stream chosen from the group of a stream comprising propane, a stream comprising C3-C4, a stream comprising C3-minus, a stream comprising butanes, a stream comprising C4-minus, a stream comprising C2-C3, a stream comprising C1-C3, a stream comprising C1-C4 and a stream comprising C2-C4 to at least one dehydrogenation unit chosen from the group of a butanes dehydrogenation unit and a propane dehydrogenation unit, or a combination thereof.

In the present process olefins and aromatics are recovered from the separated mixed product stream(s).

According to a preferred embodiment the process further comprises combining the LPG comprising stream originating from said first hydrocracking zone with the LPG comprising stream originating from said second hydrocracking zone.

According to another preferred embodiment the process further comprises recovering vapour products from the coker liquid product(s) and combining the vapour products thus recovered with the LPG comprising stream(s). The gas/liquid effluent of the coker zone can be recycled to any of the process units that best matches the composition and pressure of the respective streams similar as to the effluent (heavier than LPG) of the second hydrocracking zone. These two recycles can be either mixed together or can be kept separate so they can go to different feed locations in the present integrated process.

According to another preferred embodiment the process further comprises separating from the first and second effluents residual liquid fractions and recycling said residual liquid fractions to inlet of the first hydrocracking and/or second hydrocracking zone. The term "first and second effluents" refer to the effluents originating from the first hydrocracking zone and the effluents originating from the second hydrocracking zone, respectively.

As mentioned above, methane can be recovered from the separated mixed product stream(s) and recycled to the steam cracker to be used as fuel for burners and/or heaters.

It is also preferred to recover and purify hydrogen from the separated mixed product stream(s) and recycle it to the inlet of the first and/or second hydrocracking zone.

According to a preferred embodiment the process further comprises recovering pyrolysis fuel oil from the separated mixed product stream(s) and recycling said pyrolysis fuel oil to the inlet of said first and/or second hydrocracking zone.

A very common process for the conversion of alkanes to olefins involves "steam cracking" As used herein, the term "steam cracking" relates to a petrochemical process in which saturated hydrocarbons are broken down into smaller, often unsaturated, hydrocarbons such as ethylene and propylene. In steam cracking gaseous hydrocarbon feeds like ethane, propane and butanes, or mixtures thereof, (gas cracking) or liquid hydrocarbon feeds like naphtha or gasoil (liquid cracking) is diluted with steam and briefly heated in a furnace without the presence of oxygen. Typically, the reaction temperature is very high, at around 850° C., but the reaction is only allowed to take place very briefly, usually with residence times of 50-500 milliseconds. Preferably, the hydrocarbon compounds ethane, propane and butanes are separately cracked in accordingly specialized furnaces to ensure cracking at optimal conditions. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time. Light hydrocarbon feeds such as ethane, propane, butanes or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons.

To separate the different hydrocarbon compounds produced by steam cracking the cracked gas is subjected to fractionation unit. Such fractionation units are well known in the art and may comprise a so-called gasoline fractionator where the heavy-distillate ("carbon black oil") and the middle-distillate ("cracked distillate") are separated from the light-distillate and the gases. In the subsequent quench tower, most of the light-distillate produced by steam cracking ("pyrolysis gasoline" or "pygas") may be separated from the gases by condensing the light-distillate. Subsequently, the gases may be subjected to multiple compression stages wherein the remainder of the light distillate may be separated from the gases between the compression stages. Also acid gases ($CO_2$ and $H_2S$) may be removed between compression stages. In a following step, the gases produced by pyrolysis may be partially condensed over stages of a cascade refrigeration system to about where only the hydrogen remains in the gaseous phase. The different hydrocarbon compounds may subsequently be separated by simple distillation, wherein the ethylene, propylene and C4 olefins are the most important high-value chemicals produced by steam cracking. The methane produced by steam cracking is generally used as fuel gas, the hydrogen may be separated and recycled to processes that consume hydrogen, such as hydrocracking processes. The acetylene produced by steam cracking preferably is selectively hydrogenated to ethylene. The alkanes comprised in the cracked gas may be recycled to the process for converting alkanes to olefins.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative hydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieve higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0 192 059 A1 and GB 2 162 082 A. The Catofin process is reported to be robust and capable of handling impurities which would poison a platinum catalyst. The products produced by a butane dehydrogenation process depends on the nature of the butane feed and the butane dehydrogenation process used. Also the Catofin process allows for the dehydrogenation of butane to form butylene; see e.g. U.S. Pat. No. 7,622,623.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawing is illustrative and is provided to further the understanding of the various aspects and embodiments of the process of the invention.

A process flow diagram including an integrated hydroprocessing process and system as indicated by reference number 101 is shown in FIG. 1. The integrated system 101 generally includes a selective hydroprocessing zone, a steam pyrolysis zone, a product separation zone and a coker zone.

The selective hydroprocessing zone includes a hydroprocessing reaction zone 5, i.e. a first hydrocracker unit, having an inlet 4 for receiving a mixture 3 containing a crude oil feed 1, a coker liquid product stream 46 from a coker unit zone 41, hydrogen 27 recycled from unit 20 and/or unit 56, i.e. units chosen from the group of a gas steam cracker unit, a butanes dehydrogenation unit, a propane dehydrogenation unit, a combined propane-butanes dehydrogenation unit, or a combination of units thereof and make-up hydrogen as necessary (not shown). Hydroprocessing reaction zone 5 further includes an outlet for discharging a hydroprocessed effluent 6. Hydroprocessed effluent 6 can be partly recycled as stream 7 to the inlet of hydroprocessing reaction zone 5, i.e. a first hydrocracker unit.

The remainder part 8 of reactor effluents 6 from the hydroprocessing reaction zone 5 are sent to a high pressure separator 9. The separator tops 11 are cleaned in an amine unit 48 and a resulting hydrogen rich gas stream 49 is passed to a recycling compressor 50 to be used as a recycle gas 51 in the hydroprocessing reactor. A bottoms stream 10 from the high pressure separator 9, which is in a substantially liquid phase, is cooled and introduced as stream 13 to a low pressure cold separator 14, where it is separated into a gas stream 15, i.e. a LPG comprising stream, and a liquid stream 29. A residual liquid phase 12 from high pressure separator 9 and a residual liquid phase 31 from low pressure cold separator 14 can be recycled to the inlet of hydroprocessing reaction zone 5, i.e. a first hydrocracker unit. Gases 15 from low pressure cold separator 14 include hydrogen, H2S, NH3 and any light hydrocarbons such as C1-C4 hydrocarbons.

LPG comprising stream 15 is further separated in unit 16 into one or more individual streams 17, 18, 19 chosen from the group of a stream comprising hydrogen, a stream comprising methane, a steam comprising ethane, a stream comprising butanes, a stream comprising propane, a stream comprising C1-minus, a stream comprising C3-minus, a stream comprising C1-C2, a stream comprising C3-C4, a stream comprising C2-C3, a stream comprising C1-C3, a stream comprising C1-C4, a stream comprising C2-C4, a stream comprising C2-minus, a stream comprising C4-minus. Although only three streams 17, 18, 19 have been shown, it is of course possible to have more individual streams. Stream 17 is sent to a gas steam cracker unit 56, and the gas steam cracker unit effluent 57 is sent to a separation section 22. Examples of stream 17 are a stream comprising ethane, a stream comprising C1-C2 and a stream comprising C2-minus.

These individual streams 18, 19 are further processed in unit 20, wherein unit 20 is to be understood as at least one unit, chosen from the group a butanes dehydrogenation unit, a propane dehydrogenation unit, a combined propane-butanes dehydrogenation unit, or a combination of units thereof to produce mixed product stream(s) 21. Unit 20 also comprises a separation section 22 for separating the mixed product stream(s) 21 into individual streams 39, 40, 23 for recovering, inter alia, olefins and aromatics from separated mixed product stream(s) 21. Separation section 22 may comprise several separation units. Although only three streams 39, 40, 23 have been shown here, it is of course possible to have more individual streams. In addition, if a stream coming from unit 22 comprises heavy hydrocarbons, for example recovered pyrolysis fuel oil from the mixed product stream(s) 21, it is possible to recycle the pyrolysis fuel oil to the inlet of the first and/or second hydrocracking zone. Stream 25 is a stream mainly comprising hydrogen. A methane comprising stream can be separated in unit 22 and recycled to the steam cracker of unit 20 but also the dehydrogenation units of unit 20 to be used there as fuel for burners and/or heaters. Hydrogen stream 25 is then passed to a hydrogen purification unit 26, such as a pressure swing adsorption (PSA) unit to obtain a hydrogen stream 27 having a purity of 99.9%+, or a membrane separation units to obtain a hydrogen stream 27 with a purity of about 95%, or any other appropriate hydrogen purification technology. The purified hydrogen stream 27 is then recycled back to serve as a major portion of the requisite hydrogen for the hydroprocessing reaction zone 5, or a part 28 thereof is recycled back to serve as a major portion of the requisite hydrogen for the second hydrocracking zone 34.

Although second hydrocracking zone 34 has been shown here as a single box, in the present description reference number 34 is to be understood as a hydrocracking zone, i.e. a hydrocracking zone comprising one or more units chosen from the group of Feed Hydrocracking (FHC), Gasoline Hydrocracking (GHC), Aromatic Ringopening, Hydrocracking (vacuum gas oil) and Resid Hydrocracking (vacuum resid), including separation sections.

All or a portion of liquid stream 30 serves as the feed 33 to the second hydrocracking zone 34. Second hydrocracking zone 34 produces a second effluent, comprising a BTXE comprising stream 36, a LPG comprising stream 35, and a liquid residual stream 37. Stream 37 can be further processed as stream 38 in coker unit zone 41, or as a stream 47 to be sent to the first hydrocracking zone 5.

In additional embodiments, a separation zone 32 is included upstream of section 34. Stream 30 is fractioned, for example by distillation or flashing, into a residual liquid phase 52 (to be sent to coker unit 41) and a lighter phase 33 (to be sent to second hydrocracking zone 34). Residual liquid phase 52 can be separated into at least two streams, i.e. a stream 53 and a stream 54, wherein stream 53 is sent to the hydroprocessing reaction zone 5 and stream 54 is sent to the coker unit 41. In an embodiment wherein second hydrocracking zone 34 is not present, liquid phase feed or stream 30 is thermally cracked in coker zone 41 under conditions effective to produce coke 42 and the coker liquid product 43, wherein the coker liquid product 43 is recycled to the first hydrocracking zone 5 and wherein petroleum coke is recovered;

Coker zone 41 can include a coker unit (or series of unit operations, including pretreatment units) that converts the comparably low value residuals or bottoms into low molecular weight hydrocarbon gases, naphtha, light and heavy gas oils, and petroleum coke.

In a process employing the arrangement shown in FIG. 1, a crude oil feedstock 1 and coker liquid products 46 are admixed with an effective amount of hydrogen 27 and 51 (and optionally make-up hydrogen, not shown), and the mixture 4 is charged to the inlet of selective hydroprocessing reaction zone 5 at a temperature in the range of from 200[deg.] C. to 600[deg.] C.

Hydroprocessing reaction zone 5 operates under parameters effective to hydrodemetallize, hydrodearomatize, hydrodenitrogenate, hydrodesulfurize and/or hydrocrack the oil feedstock, which in certain embodiments is crude oil. In certain embodiments, hydroprocessing is carried out using the following conditions: operating temperature in the range of from 200[deg.] C. to 600[deg.] C.; operating pressure in the range of from 0.2 to 20 MPa; and a liquid hour space velocity (LHSV) in the range of from 0.1 h<−1> to 10 h<−1>.

The residual liquid fractions 38 can be prepared in a feedstock conditioning unit (not shown) to produce a dried coker feedstock. This feedstock to coker unit zone 41 can be adjusted to an effective temperature, e.g., 400-500[deg.] C. within a coking process unit, causing thermal cracking which produces coke and coker liquid products. The coke 42 is removed from coke drums and in certain embodiments possesses sulphur content significantly lower than 3.0 wt % and in further embodiments lower than 1.5 wt %, prior to calcination. This results in a grade of coke that is within the low sulphur anode grade coke range. The balance of the material produced is coker overhead liquid 43, which is highly unsaturated. From this coker overhead liquid 43 a light fraction 45 can be separated in unit 44 and combined with the LPG comprising stream 15. The remainder part of coker overhead liquid 43 will be sent as stream 46 to the inlet of the first hydrocracker unit 5, as a heavy fraction where the material is saturated to maximize the yield of olefins and aromatic products. In a specific embodiment, especially when stream 43 contains a sufficient amount of olefins, stream 43 can be (partly) sent as a stream 55 to separation unit 22. In another specific embodiment (not shown) it is also possible to send (a part of) stream 45 directly to separation unit 22. It is also possible for the residual liquid stream 37 to by pass the coker zone 41 as a stream 47, which stream 47 is returned, as a stream 46, to the inlet of first hydrocracking zone 5. In specific embodiments it is also possible for stream 46 to be sent (partly) to high pressure separator 9, that is to by pass first hydrocracking zone 5.

As mentioned above, second hydrocracking zone 34 is a hydrocracking zone comprising one or more units chosen from the group of Feed Hydrocracking (FHC), Gasoline Hydrocracking (GHC), Aromatic Ringopening, Hydrocracking (gas oil) and Resid Hydrocracking (vacuum resid). The preferred FHC conditions include a temperature of 300-550° C., a pressure of 300-5000 kPa gauge and a Weight Hourly Space Velocity of 0.1-10 h−1. More preferred feed hydrocracking conditions (FHC) include a temperature of 300-450° C., a pressure of 300-5000 kPa gauge and a Weight Hourly Space Velocity of 0.1-10 h−1. Even more preferred FHC conditions optimized to the ring-opening of aromatic hydrocarbons include a temperature of 300-400° C., a pressure of 600-3000 kPa gauge and a Weight Hourly Space Velocity of 0.2-2 h−1. The preferred gasoline hydrocracking conditions (GHC) include a temperature of 300-580° C., more preferably of 400-580° C. and even more preferably of 430-530° C., a pressure of 0.3-5 MPa gauge, more preferably at a pressure of 0.6-3 MPa gauge, particularly preferably at a pressure of 1-2 MPa gauge and most preferably at a pressure of 1.2-1.6 MPa gauge, and a Weight Hourly Space Velocity (WHSV) of 0.1-20 h−1, more preferably at a Weight Hourly Space Velocity of 0.2-15 h−1 and most preferably at a Weight Hourly Space Velocity of 0.4-10 h−1. The aromatic ring opening process (ARO process, see for example U.S. Pat. No. 7,513,988) may comprise aromatic ring saturation at a temperature of 100-500° C., preferably 200-500° C., more preferably 300-500° C., a pressure of 2-10 MPa together with 1-30 wt.-%, preferably 5-30 wt.-% of hydrogen (in relation to the hydrocarbon feedstock) in the presence of an aromatic hydrogenation catalyst and ring cleavage at a temperature of 200-600° C., preferably 300-400° C., a pressure of 1-12 MPa together with 1-20 wt.-% of hydrogen (in relation to the hydrocarbon feedstock) in the presence of a ring cleavage catalyst, wherein said aromatic ring saturation and ring cleavage may be performed in one reactor or in two consecutive reactors. The process conditions used for hydrocracking generally includes a process temperature of 200-600° C., elevated pressures of 0.2-20 MPa, space velocities between 0.1-20 h−1.

The invention claimed is:

1. An integrated hydrocracking process for production of olefinic and aromatic petrochemicals from a hydrocarbon feedstock comprising crude oil, the process comprising:
   treating the hydrocarbon feedstock comprising crude oil and a coker liquid product in a first hydrocracking zone in the presence of hydrogen under conditions producing a first effluent having an increased hydrogen content;
   separating the first effluent into a liquefied petroleum gas (LPG) comprising stream and a liquid phase stream;
   separating said LPG comprising stream into one or more streams selected from the group consisting of a stream comprising hydrogen, a stream comprising methane, a steam comprising ethane, a stream comprising butanes, a stream comprising propane and a stream comprising C4-minus;
   further processing one or more of the streams obtained in a steam cracker unit and at least one unit chosen from a butanes dehydrogenation unit, a propane dehydrogenation unit, a combined propane-butanes dehydrogenation unit, or a combination of units thereof to produce a mixed product stream(s);
   feeding said mixed product stream(s) from said steam cracker unit and said at least one unit, chosen from said butanes dehydrogenation unit, said propane dehydrogenation unit, said combined propane-butanes dehydrogenation unit, or said combination of units thereof to a second separation section;
   thermally cracking the liquid phase feed under effective conditions producing coke and a coker liquid product, wherein the coker liquid product is recycled to the first hydrocracking zone and wherein petroleum coke is recovered;
   separating the mixed product stream(s).

2. An integrated hydrocracking process for production of olefinic and aromatic petrochemicals from a hydrocarbon feedstock comprising crude oil, the process comprising:
   treating the hydrocarbon feedstock comprising crude oil and a coker liquid product in a first hydrocracking zone in the presence of hydrogen under conditions producing a first effluent having an increased hydrogen content;
   separating the first effluent into a liquefied petroleum gas (LPG) comprising stream and a liquid phase stream;
   separating said LPG comprising stream into one or more streams selected from the group consisting of a stream comprising ethane and a stream comprising C2-minus;
   further processing one or more of the streams obtained in a steam cracker unit and at least one unit chosen from a butanes dehydrogenation unit, a propane dehydrogenation unit, a combined propane-butanes dehydrogenation unit, or a combination of units thereof to produce at lease one mixed product stream;

feeding said at least one mixed product stream from said steam cracker unit and said at least one unit, chosen from said butanes dehydrogenation unit, said propane dehydrogenation unit, said combined propane-butanes dehydrogenation unit, or said combination of units thereof to a second separation section;

thermally cracking the liquid phase feed under effective conditions producing coke and a coker liquid product, wherein the coker liquid product is recycled to the first hydrocracking zone and wherein petroleum coke is recovered;

separating the at least one mixed product stream, and feeding at least one stream chosen from the group of said stream comprising ethane, and said stream comprising C2-minus to said steam cracker unit.

3. The process according to claim 1, further comprising feeding at least one stream chosen from said stream comprising propane, said stream comprising butanes said stream comprising C4-minus, to at least one dehydrogenation unit chosen from said butanes dehydrogenation unit and said propane dehydrogenation unit, or a combination thereof.

4. The process according to claim 1, further comprising:
recovering olefins and aromatics from the separated mixed product stream.

5. The process according to claim 1, further comprising:
treating said liquid phase feed in a second hydrocracking zone in the presence of hydrogen under effective conditions producing a second effluent having an increased hydrogen content; and
recovering from the second effluent from said second hydrocracking zone a stream comprising a mixture of benzene, toluene, xylenes, and ethyl benzene (BTXE), a LPG comprising stream and a residual liquid stream.

6. The process according to claim 5, further comprising thermally cracking said residual liquid stream under effective conditions producing coke and the coker liquid product, wherein:
the coker liquid product is recycled to an inlet of the first hydrocracking and/or second hydrocracking zone, and wherein petroleum coke is recovered.

7. The process according to claim 5, further comprising combining the LPG comprising stream originating from said first hydrocracking zone with the LPG comprising stream originating from said second hydrocracking zone.

8. The process according to claim 1, further comprising recovering vapour products from the coker liquid product and combining the vapour products recovered with the LPG comprising stream(s).

9. The process according to claim 5, further comprising separating from the first effluent originating from said first hydrocracking zone and the effluent originating from said second hydrocracking zone residual liquid fractions and recycling said residual liquid fractions to inlet of the first hydrocracking and/or second hydrocracking zone.

10. The process according to claim 1, further comprising recovering methane from the separated mixed product stream(s) and recycling said methane to the steam cracker to be used as fuel for burners and/or heaters.

11. The process according to claim 5, further comprising recovering and purifying hydrogen from the separated mixed product stream(s) and recycling it to an inlet of the first and/or second hydrocracking zone.

12. The process according to claim 5, further comprising recovering pyrolysis fuel oil from the separated mixed product stream(s) and recycling said pyrolysis fuel oil to an inlet of said first and/or second hydrocracking zone.

13. The process according to claim 1, further comprising:
recovering an olefin from the separated mixed product stream.

14. The process according to claim 1, further comprising:
recovering aromatic from the separated mixed product stream.

15. The process according to claim 1, further comprising recovering vapour products from the coker liquid product.

16. The process according to claim 1, further comprising:
treating said liquid phase feed in a second hydrocracking zone in the presence of hydrogen under effective conditions producing a second effluent having an increased hydrogen content.

17. The process according to claim 1, further comprising:
treating said liquid phase feed in a second hydrocracking zone in the presence of hydrogen under effective conditions producing a second effluent having an increased hydrogen content; and
recovering from the second effluent from said second hydrocracking zone a LPG comprising stream.

18. The process according to claim 1, further comprising:
treating said liquid phase feed in a second hydrocracking zone in the presence of hydrogen under effective conditions producing a second effluent having an increased hydrogen content; and
recovering from the second effluent from said second hydrocracking zone a stream comprising a mixture of benzene, toluene, xylenes, and ethyl benzene (BTXE).

19. The process according to claim 1, further comprising:
treating said liquid phase feed in a second hydrocracking zone in the presence of hydrogen under effective conditions producing a second effluent having an increased hydrogen content; and
recovering from the second effluent from said second hydrocracking zone a residual liquid stream.

20. The process according to claim 1, further comprising recovering methane from the separated mixed product stream(s).

* * * * *